(12) United States Patent
  Sisk et al.

(10) Patent No.: US 10,766,694 B2
(45) Date of Patent: Sep. 8, 2020

(54) ALTERNATIVE BOTTOM DROP AND STRAIGHT TEE DISCHARGE FROM BULK TANK HAVING VARIOUS EXTENSIONS FOR AUTOMATIC AND MANUAL OPERATIONS OF THE TEE VALVE

(71) Applicants: David E Sisk, Bonne Terre, MO (US);
 Jason Huskey, Park Hills, MO (US);
 Peter Kemp, St. Louis, MO (US)

(72) Inventors: David E Sisk, Bonne Terre, MO (US);
 Jason Huskey, Park Hills, MO (US);
 Peter Kemp, St. Louis, MO (US)

(73) Assignee: Bulk Tank, Inc., Park Hills, MD (US)

(*) Notice: Subject to any disclaimer, the term of this patent is extended or adjusted under 35 U.S.C. 154(b) by 51 days.

(21) Appl. No.: 16/350,884

(22) Filed: Jan. 28, 2019

(65) Prior Publication Data

US 2019/0233203 A1   Aug. 1, 2019

Related U.S. Application Data

(60) Provisional application No. 62/709,804, filed on Jan. 31, 2018.

(51) Int. Cl.
| | | |
|---|---|---|
| *B65D 90/62* | (2006.01) | |
| *F16K 11/052* | (2006.01) | |
| *B65D 88/28* | (2006.01) | |
| *F16L 41/02* | (2006.01) | |
| *F16K 27/02* | (2006.01) | |
| *F16K 1/20* | (2006.01) | |
| *F16K 31/60* | (2006.01) | |
| *F16K 31/04* | (2006.01) | |
| *F16K 31/46* | (2006.01) | |
| *B60P 3/22* | (2006.01) | |

(52) U.S. Cl.
 CPC ............ *B65D 90/623* (2013.01); *B60P 3/224* (2013.01); *B65D 88/28* (2013.01); *F16K 1/2028* (2013.01); *F16K 11/0525* (2013.01); *F16K 27/0227* (2013.01); *F16K 27/0263* (2013.01); *F16K 31/041* (2013.01); *F16K 31/46* (2013.01); *F16K 31/602* (2013.01); *F16L 41/021* (2013.01)

(58) Field of Classification Search
 None
 See application file for complete search history.

(56) References Cited

U.S. PATENT DOCUMENTS

| | | | | |
|---|---|---|---|---|
| 1,733,897 A | * | 10/1929 | McNeill ................ | D01G 23/08 137/597 |
| 2,644,722 A | * | 7/1953 | Childress ............... | B65G 53/66 406/151 |
| 4,085,977 A | * | 4/1978 | Varga ..................... | D01G 23/08 19/105 |

(Continued)

*Primary Examiner* — John Fox
(74) *Attorney, Agent, or Firm* — Paul M. Denk

(57) ABSTRACT

An alternative bottom drop and straight tee discharge from bulk tank conveying granular material, the tee having extensions for the automatic and manual operations of a disc valve, pivotally located within the horizontal section of the tee, during functioning. The disc valve may be manually operated, or pivoted through motorized operations, to allow for the alternative flow of bulk material from the vehicle hopper. The disc valve has an annular disc, integrally formed with upright supports, that are bearing mounted by shafts to the sidewalls of the structured tee.

9 Claims, 15 Drawing Sheets

(56) References Cited

U.S. PATENT DOCUMENTS

| | | |
|---|---|---|
| 7,975,824 B1 * | 7/2011 | Nolin .................... B65G 53/56 |
| | | 193/31 A |
| 7,988,386 B2 | 8/2011 | Sisk |
| D673,657 S | 1/2013 | Sisk |
| D678,471 S | 3/2013 | Sisk |
| 8,479,771 B2 * | 7/2013 | Campbell ............. F16K 11/076 |
| | | 137/625.47 |
| 8,727,306 B2 | 5/2014 | Sisk |
| 8,807,529 B2 | 8/2014 | Sisk |
| 9,175,796 B2 | 11/2015 | Sisk |
| 9,267,611 B2 | 2/2016 | Sisk |
| 9,328,855 B2 | 5/2016 | Sisk |

* cited by examiner

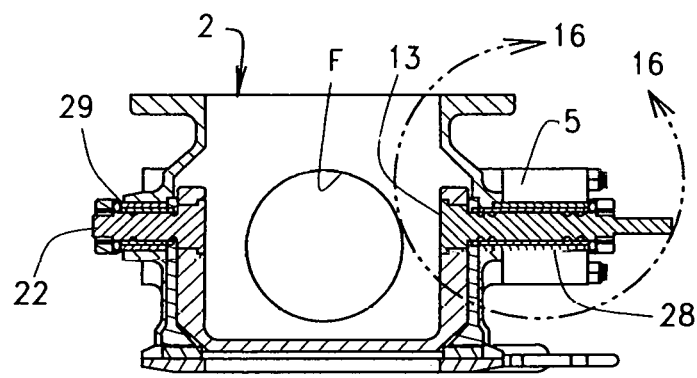
F I G. 15
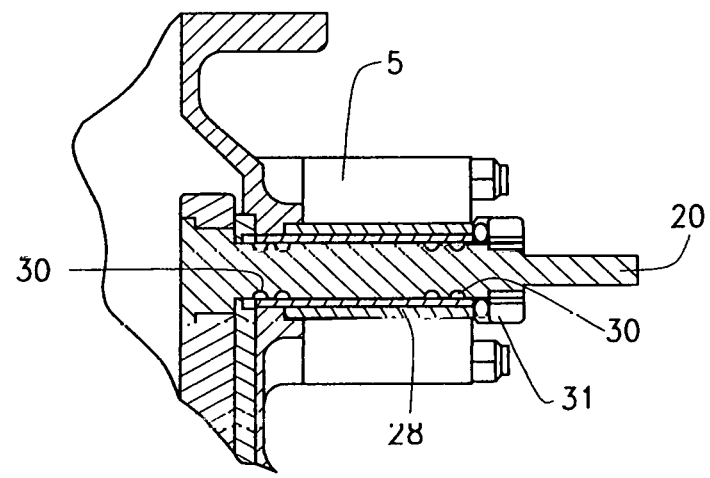
F I G. 16

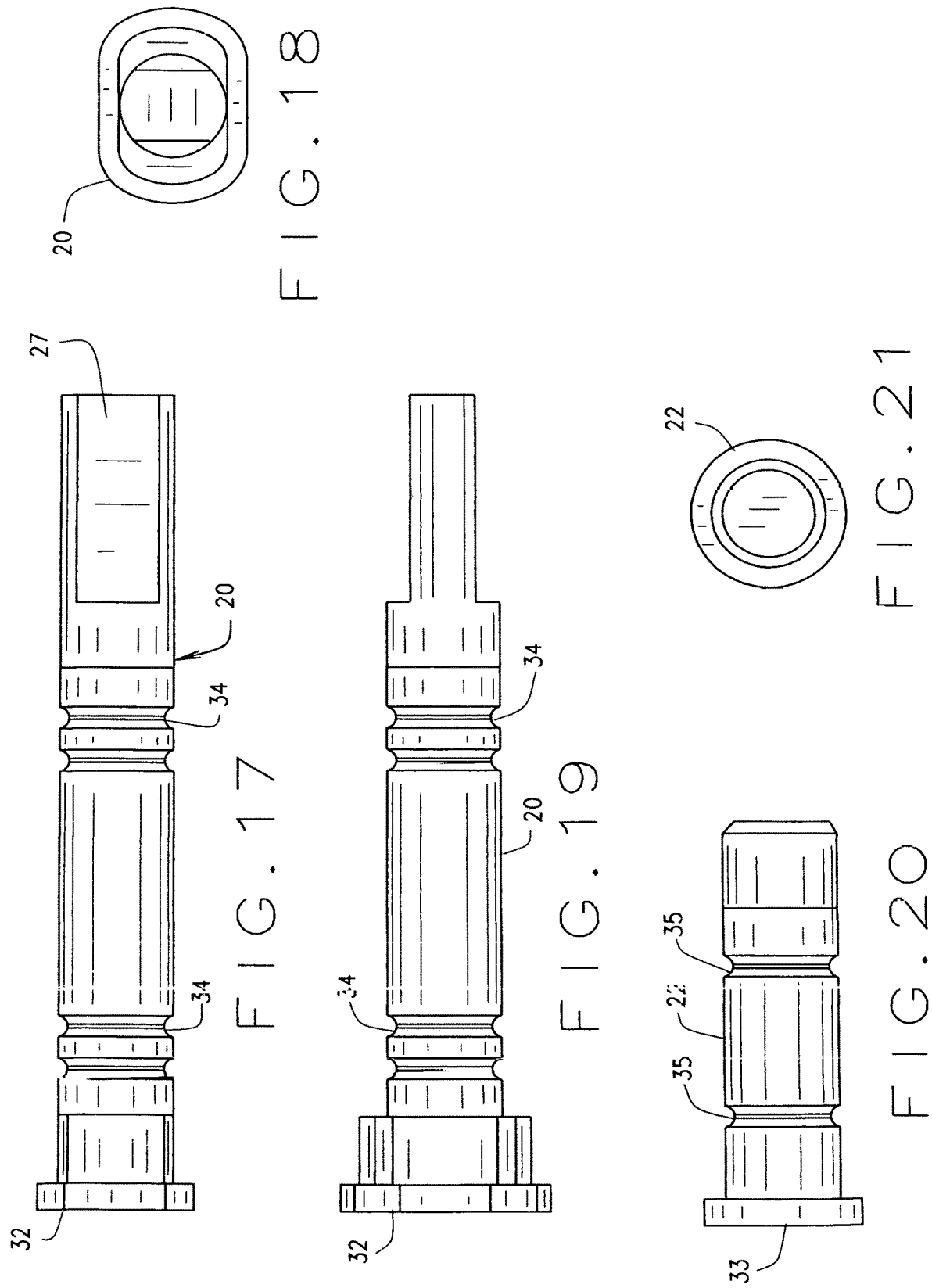

ALTERNATIVE BOTTOM DROP AND STRAIGHT TEE DISCHARGE FROM BULK TANK HAVING VARIOUS EXTENSIONS FOR AUTOMATIC AND MANUAL OPERATIONS OF THE TEE VALVE

FIELD OF THE INVENTION

This invention relate to bulk tank conveying vehicles, rather it be a tank trailer, railroad car, or the like, and having a tee that can be alternatively manipulated to provide for either the bottom drop of its bulk granular cargo, or for straight conveyance through the tee to another location, by air pressure, simply through the manipulation of the various extensions from the butterfly valve of the tee, whether it be manual operative extensions, or automatically operated from a motorized action actuator, to provide for either the bottom drop, or straight flow, of bulk material through the tee during unloading.

BACKGROUND OF THE INVENTION

This invention contemplates the formation of a hopper tee, that locates underneath of a bulk tank of a tank trailer, or railroad hopper, or any other means of conveyance of granular or related materials. Then, the tee may alternatively be utilized for orienting a disc valve, that allows for the vertical dropping of the material load downwardly for collection at the site of its unloading, or its disc valve may be pivoted to some degree, to close off the drop aspect of the tee, and allow for the bulk material to be conveyed, by air pressure, along the length of the tee and into conveyance means, such as hose or tubing, to a different location for deposit or storage. Thus, the tee of this invention has alternative applications, either as a bottom drop tee, or straight line tee for discharge of its granular load.

Hoppers, or tank trailers, regularly transport bulk commodities such as industrial and food products, and related materials. When the hopper or tank trailer reaches its destination, the bulk commodity is unloaded, typically by a power take off driven truck mounted blower, or a pneumatic system at a plant or factory. The bulk commodity generally unloads from the hopper and into a pipe line, or other means of conveyance, such as a hose, that connects to the tee of the vehicle. To complete the unloading, the hopper tees are mounted to the discharge outlet of the hoppers, or bins, usually a tee provided at each area of discharge. The tees may be interconnected together, by means of a hose line, or have its own separate transfer line, for discharge of the bulk material. Usually, such tees include a valve body, locating below the discharge outlet of the tank trailer, and which valve regulates the amount of product discharged into the hopper tee. The hopper tee conventionally has a vertical section of constant dimension and shape, and an integral horizontal section also of constant dimension of shape forming the inverting tee shape configuration, as formed. Usually, such a tee will include a butterfly valve that allows for transfer of the bulk material into the tee. Usually, to transfer the bulk commodity, the material is moved out of the hopper, or bin, by gravity flow or air pressure vibration through the valve body and into the vertical section of the said tee. The discharge pipe is connected to the horizontal section of the tee for pneumatic conveyance of the bulk material through the pipe which occurs by establishing a pressure differential in the pipe.

The prior art hopper tees have a complete, one piece assembly that includes a vertical section, connecting to a hopper, or to a butterfly valve between the two, and a horizontal section, connecting to the discharge pipe, as aforesaid. The prior art hopper tee design fits below the bottom of the bins of the pneumatic tank trailers. Typically, the valve of the bin bolts to the flange of the hopper tee, or to the butterfly valve intermediate thereof. Installation and removal of a valve typically requires pivoting the hopper tee completely away from the bottom of the valve. Prior art hopper tees generally pivot about an axis parallel to the horizontal section, but spaced away from the central longitudinal axis of the hopper tee. In opening a prior art hopper tee, the hopper tee swings downwardly and through nearly a right angle so that the valve body can be installed or removed. Swinging of the hopper tee rotates the tee so that a significant portion of the ground clearance below the hopper tee comes occupied by the hopper tee, generally for most of the overall height of the vertical section.

Although prior hopper tees function well for their intending purposes, some hopper tees could function as bottom drop tees, which allows for discharge of its granular material directly downwardly, into a collection area. Most hopper tees simply have the horizontal section, and allows for the longitudinal transfer by pressurized air of the granular material for conveyance through an associated hose or pipe, connected to the tee, to a distant location, for deposit or usage.

Usually, the Department of Transportation (DOT) and State Highway Departments have established heights, widths, and lengths, of the tank trailers, and the various clearances that must be met to comply with regulations. Thus, where the hopper tee incorporates a lower closure member, that allows for the bottom drop type of deposit of its granular material, such a closure member needs to pivoted downwardly, usually, the regulations governing the heights of the tees and their operative components above the ground, in many instances, were not met. Furthermore, as previously reviewed, many of the hopper tees could only be used for the longitudinal delivery of the granular material, or, in a separate embodiment, provide for the downward deposit of the bulk material.

Examples of earlier style of bottom drop tees can be seen in the United States patent to the inventor herein, Mr. Sisk, in U.S. Pat. No. 7,988,386, upon a Split Collar with Offset Hook and Hinge Hopper Assembly. This particular embodiment can both be used for the horizontal or longitudinally delivery of granular material, or as noted in FIG. 8, its closure member could be pivoted downwardly, to allow for bottom drop characteristics from its bottom opening, as can also be noted in FIG. 17.

The U.S. Pat. No. 9,175,796, to the same inventor, shows a hopper tee with conformable arcuate closure member. Likewise, this particular embodiment required the pivoting of a cam means, for opening of its bottom cover, to provide for discharge or dropping of the granular material directly downwardly through and from its associated tee.

Pat. No. D673,657, shows a fluted hopper tee, to the same inventor, to obtain the drop tee characteristics for unloading of its granular material.

Pat. No. D678,471, to the same inventor, shows a valve with a handle extension. This is a butterfly valve that may locate intermediate the bottom flange of the tank trailer, and the upper flange of the tee, to provide for controller release of granular material into the tee, for other transfer.

U.S. Pat. No. 8,807,529, shows a form of handle extension for a butterfly valve as used in combination with a hopper tee.

U.S. Pat. No. 8,727,306, to Mr. Sisk, shows a valve handle for butterfly valve for bulk commodity hopper with tee. This handle has a form of extended portion, to allow for its leveraged usage in the opening and closing of the butterfly valve operatively associated with the tee.

U.S. Pat. No. 9,328,855, shows another tee and unload line with integrated cam lock. This shows how the flow line or hose can be fastened to the tee, to provide for longitudinal conveyance of granular material from its associated tank trailer, or other vehicle.

U.S. Pat. No. 9,267,611, shows a multi-angle butterfly valve extension assembly, that facilitates the opening and closing of the butterfly valve, leading towards the tee, for discharge of granular material.

These are examples of the type of prior art that exist relating to the use of valves, such as butterfly valves, in combination with hopper tees, as secured with the bottom of the bin of a bulk tank, to provide for further conveyance of the shipped granular material to another location for usage or storage.

SUMMARY OF THE INVENTION

This invention contemplates modifications to the structural tee for use with the bulk tank delivery of granular material for a variety of uses. Granular material may be conveyed in tank trailers, railroad cars, other vehicles, and usually is discharged from the bottom of the transport bin, through a butterfly or other valve, into a hopper tee, for either a bottom drop of such material directly downwardly, or for longitudinal conveyance by air pressure to another location. The concept of this invention is to provide a disc valve, that locates directly within the tee, and is pivotal between a position where it blocks the bottom drop of the granular material directly downwardly from the tee, or such valve can be pivoted approximately 90°, to allow for the dropping downwardly of such material, while blocking the horizontal air flow through the tee, which normally allows for the horizontal flow of such material through piping or hose to another location for usage.

The concept of this invention is to provide an alternative bottom drop and straight tee discharge from a bulk tank trailer or other vehicle having various extensions for the automatic or manual operations of a disc valve provided within the tee as affixed to the bulk material carrier. Essentially, the invention includes the adaptation to the interior of the tee, that has longitudinal openings therethrough, as standard with such tees, and also has a bottom drop opening, directly below the vertical portion of the tee, so that in the alternative, depending upon the location of its pivotal disc valve, the granular material cargo can be either longitudinally or horizontally transferred through the tee, by means of compressed air pressure, or it can drop out the bottom of the tee, through its bottom opening. The disc valve is generally of a U shaped configuration, having a disc type valve that can generally seal against the bottom drop opening, for horizontal cargo flow, or it can be pivoted approximately 90° to block off the flow of the compressed air, to allow for the flow out of the bottom of the tee, when functioning as a bottom drop type of conveyance.

In addition, the means for turning of the disc valve may be either the inclusion of a handle to the valve shaft, that can be manually turned approximately 90°, to attain the type of flow as desired. Or, the handle may be operatively associated with an extension means, so that the handle is generally located at a more convenient position approximately waist high for the operator to make the various pivots, to the disc valve, depending upon the type of discharge as desired. Or, a motor means, whether it be an electrical motor, hydraulic motor, or other form of motor means, can connect with the valve shaft, and all the operator needs to do is to engage the proper switch, to allow for the pivot of the disc valve either in one direction, or the other, automatically through the use of the motor means, to attain the type of discharge as desired.

As previously stated, the disc valve is generally U shaped, but having a somewhat squared off configuration, with the valve itself generally being at the bottom of the configured U shape, and having a pair of approximately perpendicularly extending portions, that mount flush onto the valve shafts, at either side of the interior of the tee, so that the disc valve can be pivoted generally from its downward position, to a position of approximately 90° upwardly, to block off either the bottom drop flow, or the horizontal flow, respectively, during usage of the alternative tee of this invention.

Various other accessories are incorporated into the alternative tee of this invention, including various gaskets that cooperate with the disc valve, in order to seal either of the openings into closure, as may be required for the situation. The valves are of a more resilient material, such as rubber, or polymer, and against which the disc valve may pivot into closure, to conveniently seal either of the openings of the hopper tee, depending upon the type of flow required. Clamp means are provided for holding such a gasket in position.

The various shafts that mount into the structure tee of this invention, at either of its interior sides, are bearing mounted, and sealed, through the use of O rings or other sealing means, so as to prevent the entrance of any moisture, or even any of the granular material being processed, from entering therein and contaminating other subsequently conveyed bulk material as understood in the art. For example, as known, particularly when polymer pellets may be conveyed, for use for molding of other items, if such pellets have one color in one conveyed load, and a number of its pellets become clogged within the structure of the bulk tank, or its tee, and contaminates polymer pellets of another load and another color, it can cause streaking in the future molding of components, which is a highly undesirable circumstance. Thus, the hopper tee of this invention, its disc valve, its various bearing shafts, are all properly structured to afford complete sealing of their components, when used, so as to prevent the clogging or binding of any granular materials, that could give rise to the type of deterioration as just stated.

It may be that camming means may also be used in the pivot of the disc valve within the butterfly valve, so that as it approaches the end of its pivot, the cam means may force the disc valve against its various valve seats, to assure that complete sealing occurs, and that binding of granular material does not occur, to avoid the type of destructive situation as just previously explained.

A further embodiment of the invention includes a valve tee combination that allows for maximum flow of granular material through the structured tee, regardless whether it is a longitudinal or horizontal type of flow, or the bottom drop flow from the tee, as previously reviewed.

It is, therefore, the principal object of this invention to provide an alternative bottom drop and straight flow hopper tee discharge from a bulk tank trailer or other vehicle that can be either automatically or manually operative in its functioning.

A further object of this invention is to provide the type of alternative flow from a hopper tee, as stated, where no ground clearance below the tee is sacrificed during its alternative functioning to discharge granular material.

Another object of this invention is to provide for a mechanized operation of an alternative discharge hopper tee where motor means may be employed to shift the tee from a bottom drop discharge, to a longitudinal or horizontal discharge, without any manual participation.

Still another object of this invention is to provide a hopper tee having an internally operative disc valve, that may be shifted to provide for the bottom drop of the bulk material load being conveyed, when discharged, or the valve can be shifted to close off the bottom drop, to allow the more standard discharge of the granular material horizontally through the tee and into an associated flow line.

Still another object of this invention is to provide a modified hopper tee, that connects to the bottom of the tank trailer bin ladened with bulk material, that needs to be discharged in one or more directions, and which can be attained through either an automatic or manual manipulation of the tee valve, in preparation for material discharge.

Still another object of this invention is to provide a uniformly structured hopper tee, incorporating a pivotal disc valve, and which of its components can be manipulated into sealed closure, without binding or holding any of the bulk material, during its discharge.

Other and objects and purposes for the invention as described herein may be come apparent to those skilled in the art upon review of the summary of the invention as provided herein, and upon undertaking a study of the description of its preferred embodiment, in view of the drawings.

BRIEF DESCRIPTION OF THE DRAWING

In referring to FIG. 1, provides an isometric view of the alternative bottom drop and straight tee discharge from a bulk tank having an extension handle for manual operations of the tee valve, during an unloading process of a tank trailer;

FIG. 4 shows a cut away view of the tee, disclosing the pivotal valve therein, being arranged to prevent the bottom drop discharge of bulk material from the tee and the bulk material tank trailer, or the like;

FIG. 15 provides a sectional view through the tee disclosing the mounting of the disc valve by its bearing and bushings to the lateral portions of the shown tee;

FIG. 16 provides a detailed view of the operative bushing and bearing that provides for pivoting of the disc valve through either automatic or manual operations during unloading of granular material from the vehicle;

FIG. 17 is a front view of the valve shaft which when operative provides for pivoting of its associated disc valve;

FIG. 18 is an end view of the shaft of claim 17;

FIG. 19 is a top view of the shaft of FIG. 17;

FIG. 20 is a side view of the stub shaft that mounts the opposite side of the disc valve to the structure of the tee;

FIG. 21 is an end view of the stub shaft of the stub shaft of FIG. 20;

DESCRIPTION OF THE PREFERRED EMBODIMENT

Figure 1:
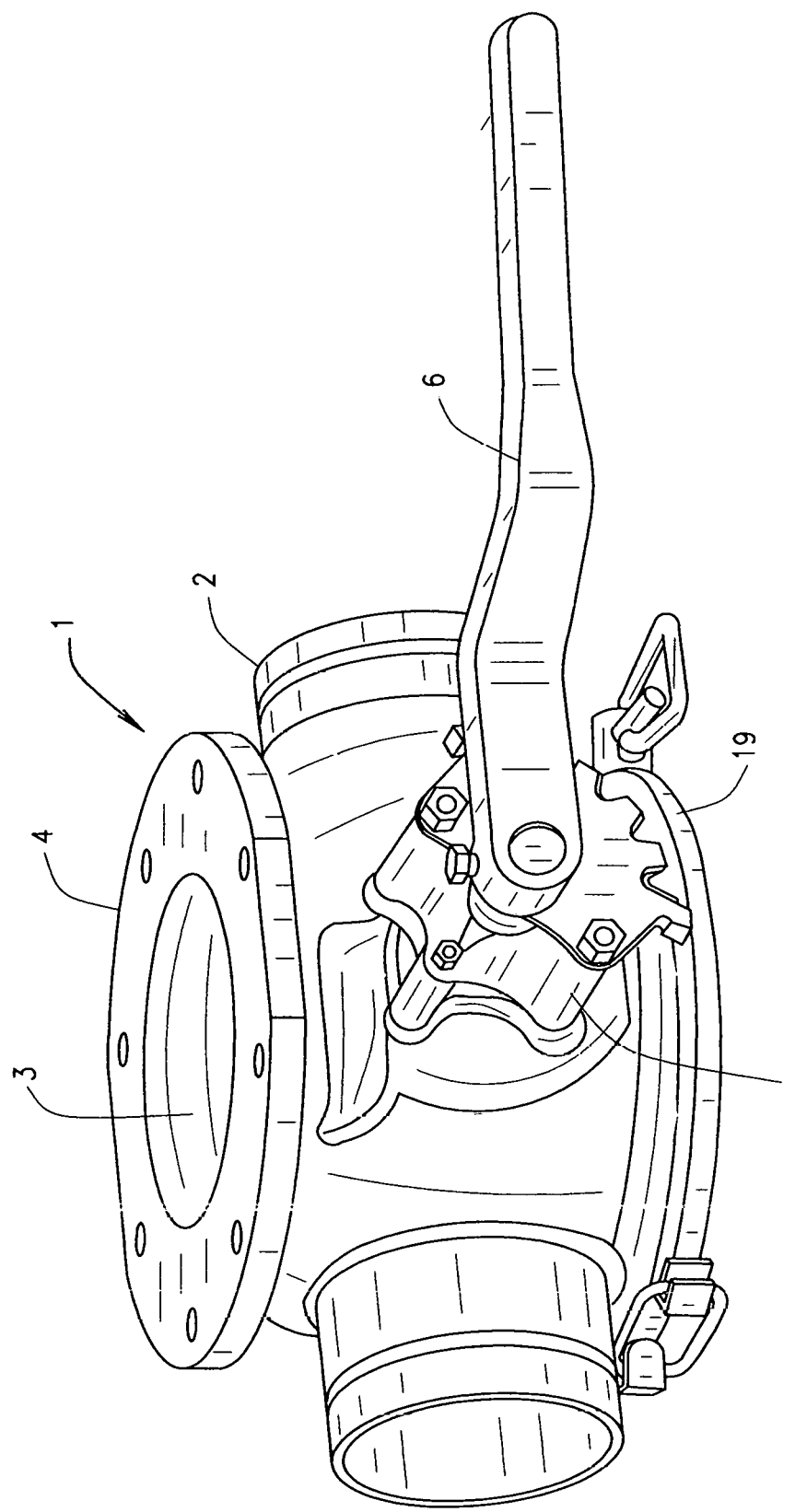

In referring to the drawings, and in particular FIG. 1, therein can be seen the modified hopper tee 1 of this invention. It includes its horizontal flow portion 2, which may be connected with a flow line, pipe, conveyance hose (not shown), one connected with each end of the section 2. Hence, in the normal discharge of granular and related material, from a tank trailer, railroad car, or the like (also not shown) usually high pressure air will enter into the left end of the tee portion 2, and it will convey the bulk material out of the right end of the said portion, for conveyance to another site for discharge. This is known in the art. In addition, the tee has a vertical portion 3, integrally formed with its horizontal section 2, and the vertical portion usually incorporates a structured flange, as at 4, as can be noted, and can be bolted to the corresponding flange provided on the bottom side of the tank trailer bin, when assembled for usage.

As can be further noted, there is lateral structure 5 that extends from the side of the tee portion 2, and which operatively connects with a disc valve (to be subsequently described), and which is manipulated between its open and closed positions, to allow for either horizontal discharge of granular material, or bottom drop discharge, through the manual turning of its associated handle 6, as noted.

Figure 2:
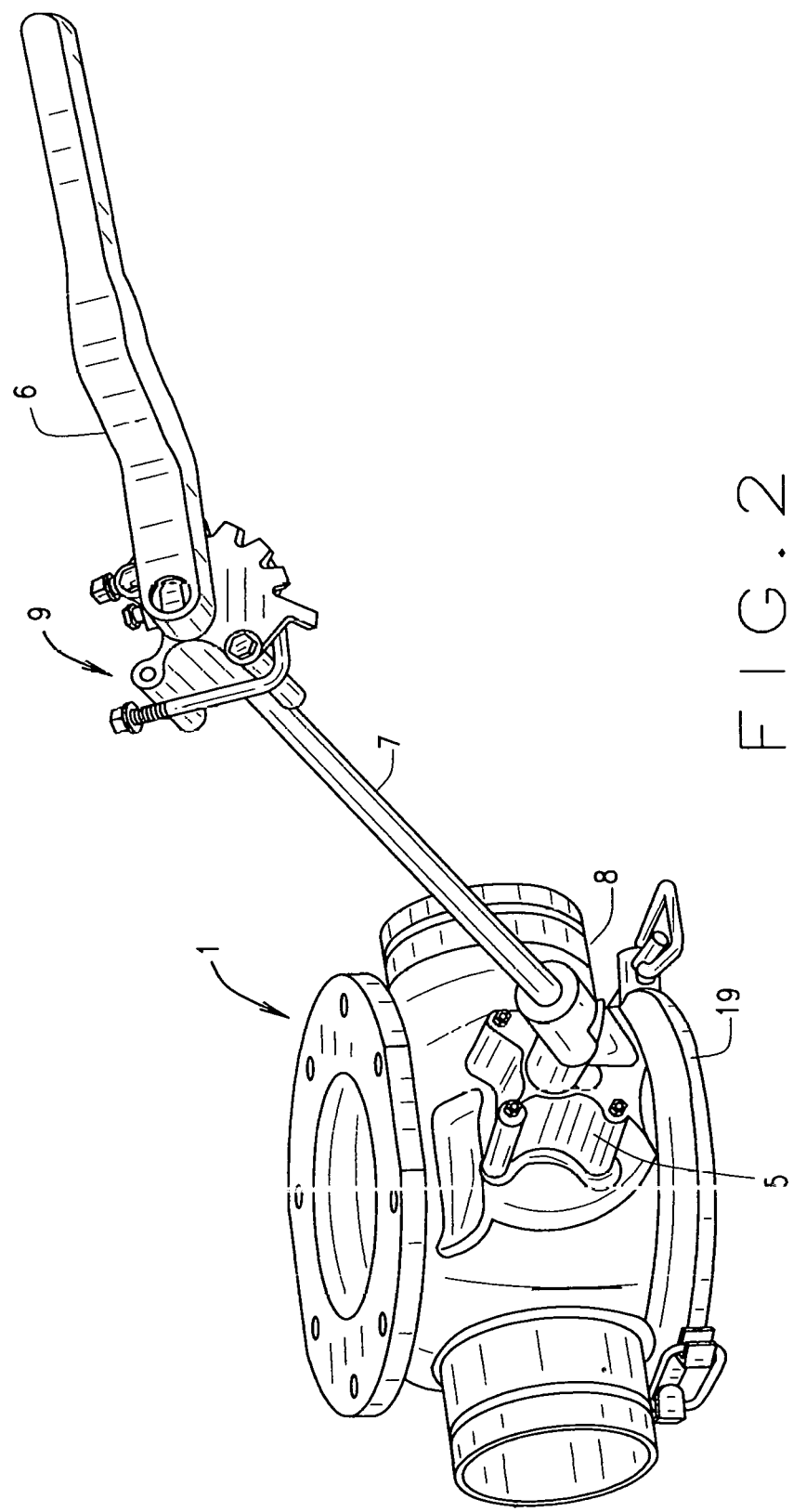
FIG. 2 shows a variations upon the extension for use with the manual operative handle to operate the valve within the shown tee.

FIG. 2 shows a further means for manipulating the internal disc valve for the structure tee 1 as can be seen. In this particular instance, the manual handle 6 secures with an extension rod 7 which connects through a universal joint 8 with the internal shaft of the structure or mount 5. Thus, since the upper end of the rod 7 is secured by a connector 9 to the structure of the tank trailer, the handle 6 will be more conveniently located to the side of the vehicle, and more openly exposed to the operator, so he/she does not need to crawl under the vehicle, as required, when manipulating the manual handle 6, of FIG. 1.

Figure 3:
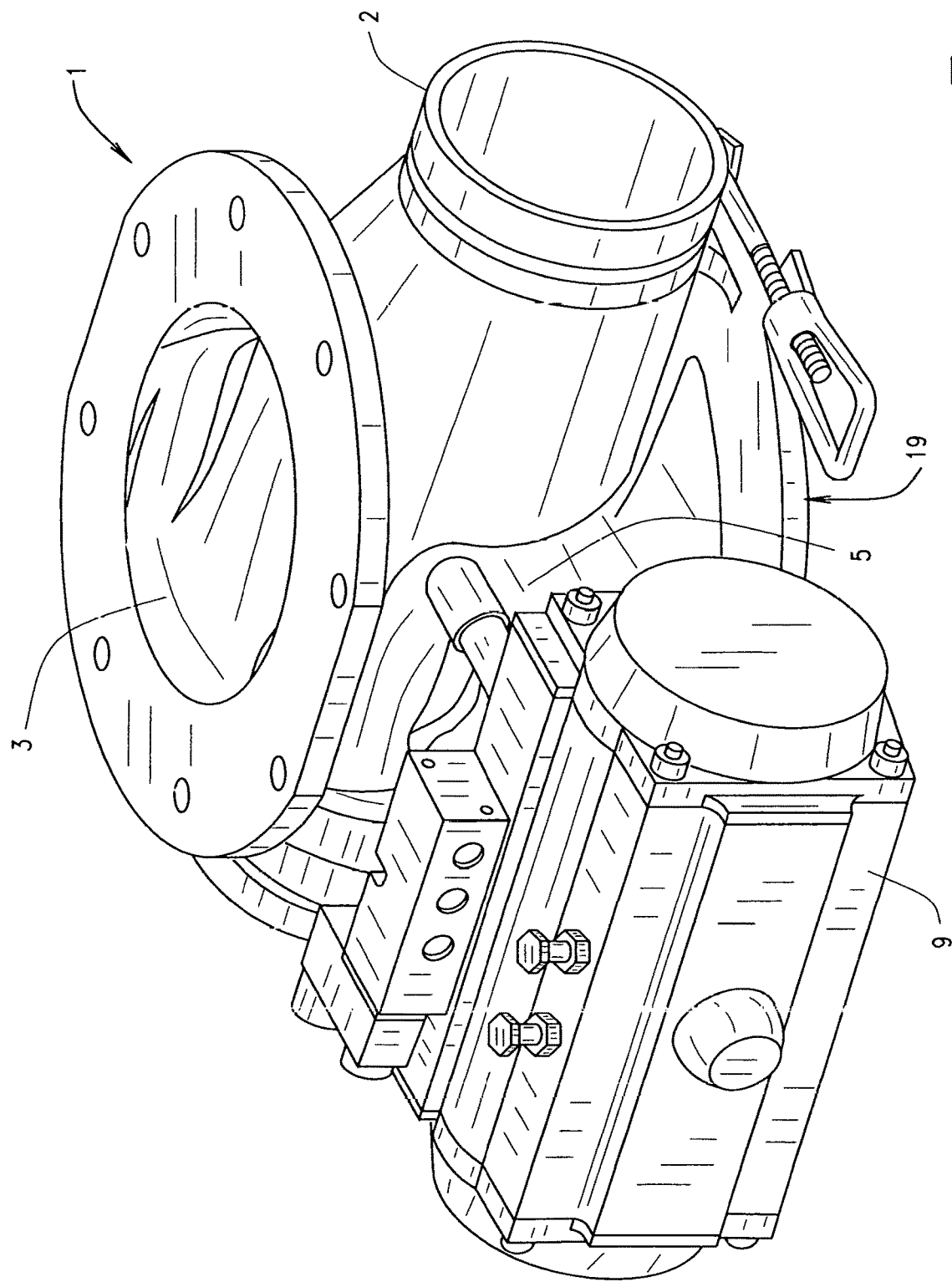
FIG. 3 shows the application of a hydraulic or electric motor operative actuator for the automatic operations of the valve within the shown tee during a bulk material discharge operation.

FIG. 3 shows a more automatic means for operating the structured tee 1 of the invention. In this particular instance, the mount 5 secures a motor means 9, which in this particular instance may be an electric motor means 9, or a hydraulic motor means, or any other type of motor that can manipulate the internal disc valve of the structured tee for pivot between its various operative positions. The particular motor means shown is an electric motor device, generally identified as the UniTorq M series actuator, that is available from UniTorq Corporation, of 2150 Boggs Road, Duluth, Ga. 30096. It incorporates pneumatic actuators for pivoting of the tees disc valve, as will subsequently described.

Figure 4:
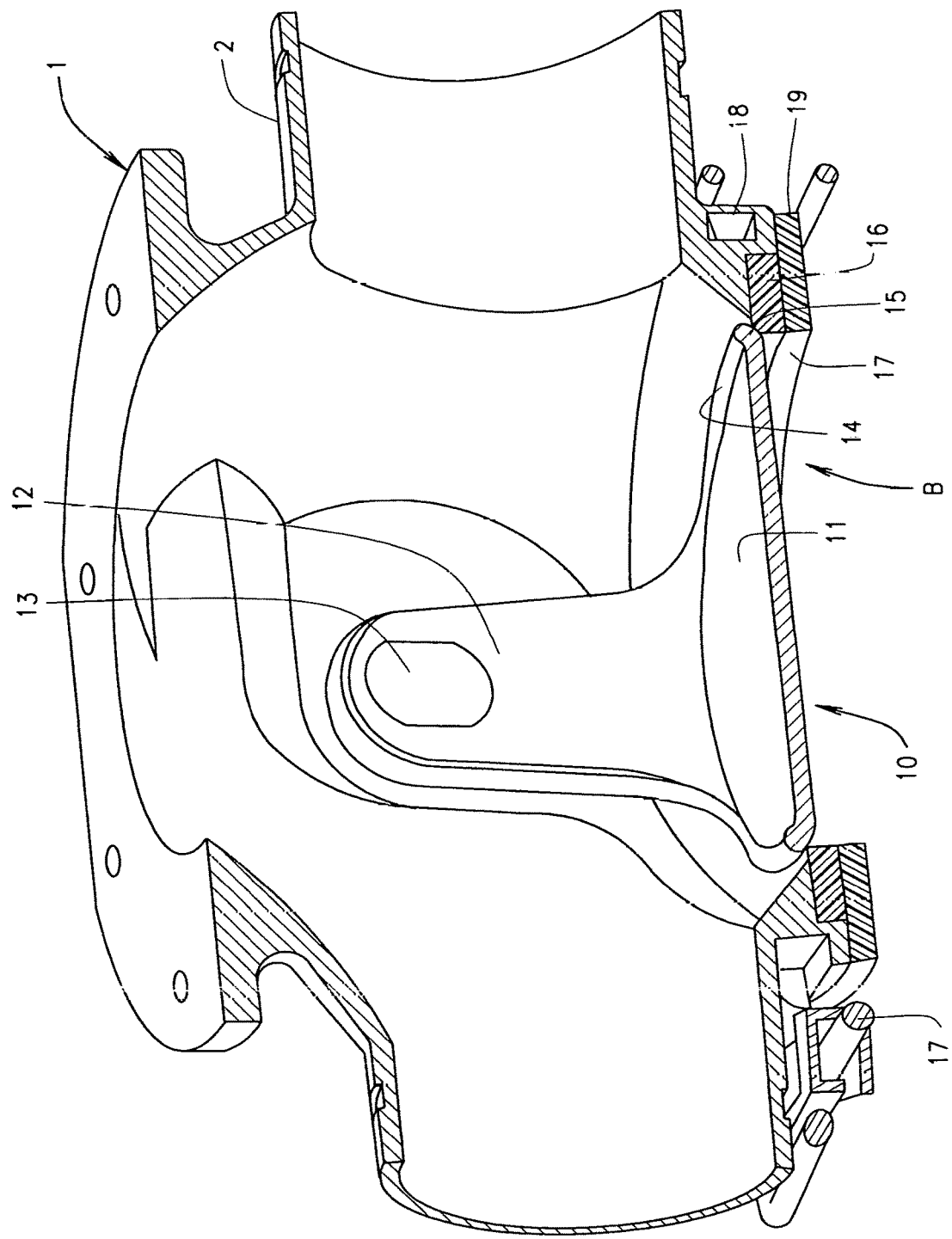

The more detailed review of the essence of this invention can be seen in FIG. 4. The structured tee 1, which is cut away in this view, shows a portion of the disc valve 10 disposed within the interior of primarily the horizontal section 2 of the shown tee. As noted, the disc valve has a bottom disc portion 11, that is integrally structured with the disc supports 12, one provided to either side of the shown disc valve, and these supports 12 secure onto the inner ends of the bearing shafts 13, forming the ends of the bearing stems for the device.

As can be noted, the disc valve 11 has an outer periphery 14, having a spherical or circular profile, that is truncated, as noted at 15, and which is disposed for sealing upon the seal gasket 16, provided around the circumference of the bottom drop B for the shown tee. An annular plate 17 mounts the gasket 16 against the bottom drop opening, or the lower structure of the shown tee, as at 18, and a clamp means as also noted at 19, as in FIG. 3, in addition to FIGS. 1 and 2, provides the means for clamping the plate and the gasket in place, surrounding the bottom drop opening B, as shown.

As noted in said FIG. 4, the disc valve 11 has been pivoted into its closure position to seal off the bottom drop opening B, when the structure tee is arranged for providing horizontal flow of the granular material as it is being discharged from the longitudinal section 2 of the structured tee.

Figure 5:
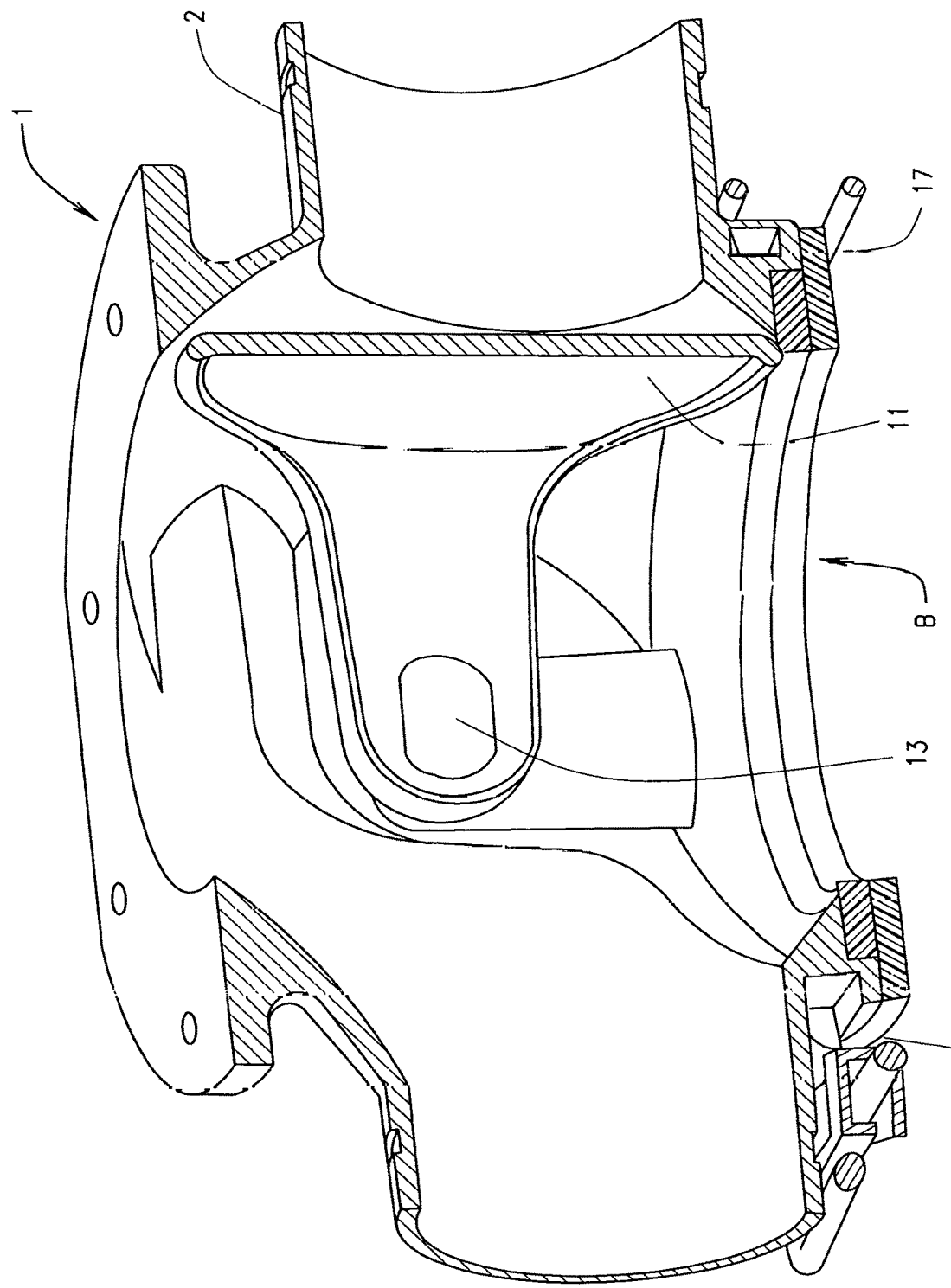
FIG. 5 is a cut away view of the valve, reoriented approximately 90° into a position for blocking the straight flow discharge of granular material from the tank trailer, or the like, during an unloading operation.

In providing for the alternative means for discharge of the material from the tank trailer, it can be noted in FIGS. 5 and 6, that the disc valve 11, as arranged at the back of the tee, has been pivoted by means of the pivot shaft 13 approximately 90°, and in this position, it blocks the incoming flow of pressurized air, through the horizontal section 2, so that, as can be noted, the bottom drop B is wide open, to allow for just that, the downward discharge of any granular material through the tee into a collection area, as the granular material is being discharged from the associated tank trailer, during an unloading performance. Hence, in view of the arrangement of the disc valve 11, within the structured tee, upon reviewing FIGS. 4 and 5 of the disclosure, the alternative means for providing discharge of the granular material, either vertically downwardly through the bottom drop opening, or for the horizontal flow under the influence of pressurized air, by arranging the disc valve in the manner as shown in FIG. 4, can be easily accomplished by the operator, either by mechanized means, as noted in FIG. 3, or by manual effort, as noted in FIGS. 1 and 2. In addition, as can further be understood, there is no sacrificing of the space between the bottom of the tee, and the ground surface, as can be seen from these various views, as occurs with prior art type of bottom drop closures, that usually pivot a closure means downwardly, as was explained with respect to the prior art embodiments relating to the processing and handling of bulk material as it is discharged from a hopper of a tank trailer.

Figure 6A:
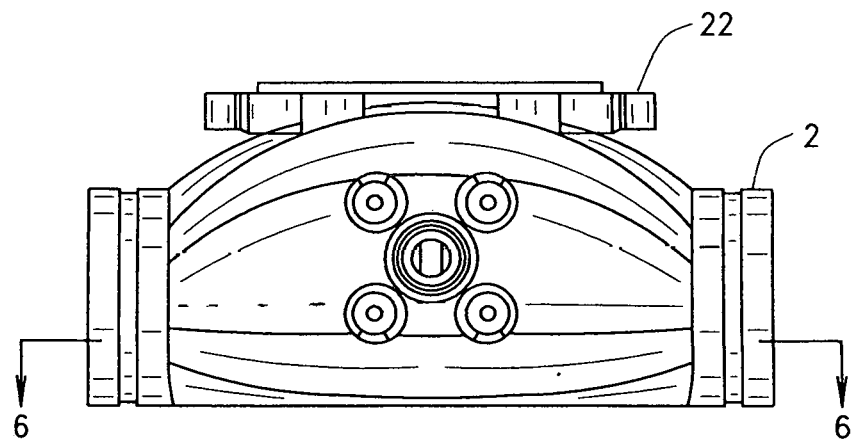
FIG. 6*a* shows a cut away view of the opposite side of the tee disclosing the pivotal valve preventing the inline discharge of bulk material from the tank trailer; and 6*b* shows a longitudinal section through the tee of FIG. 6*a;*
Figure 6B:
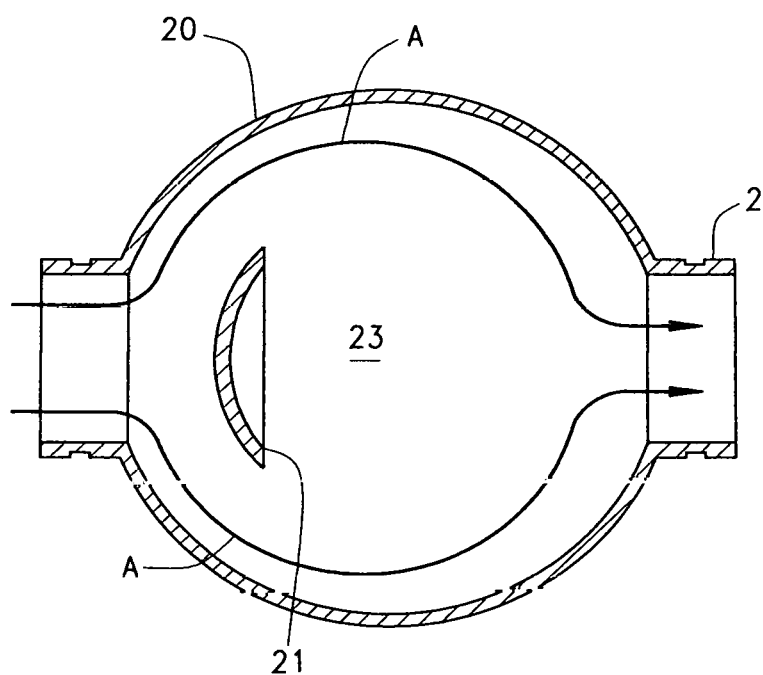

As can be seen in FIGS. 6a and 6b, the horizontal portion of the tee 2, may be widened into a more spherical shape, as noted at 20, and this enlarged body provides an area for air to flow around the ball valve 21, to provide a more expansive area for the granular material to flow through the tee flange 22, and into the structured embodiment 23 of the tee, directly below the discharge area from the hopper bin, as can be understood. The air flow can be noted at A.

Figure 7:
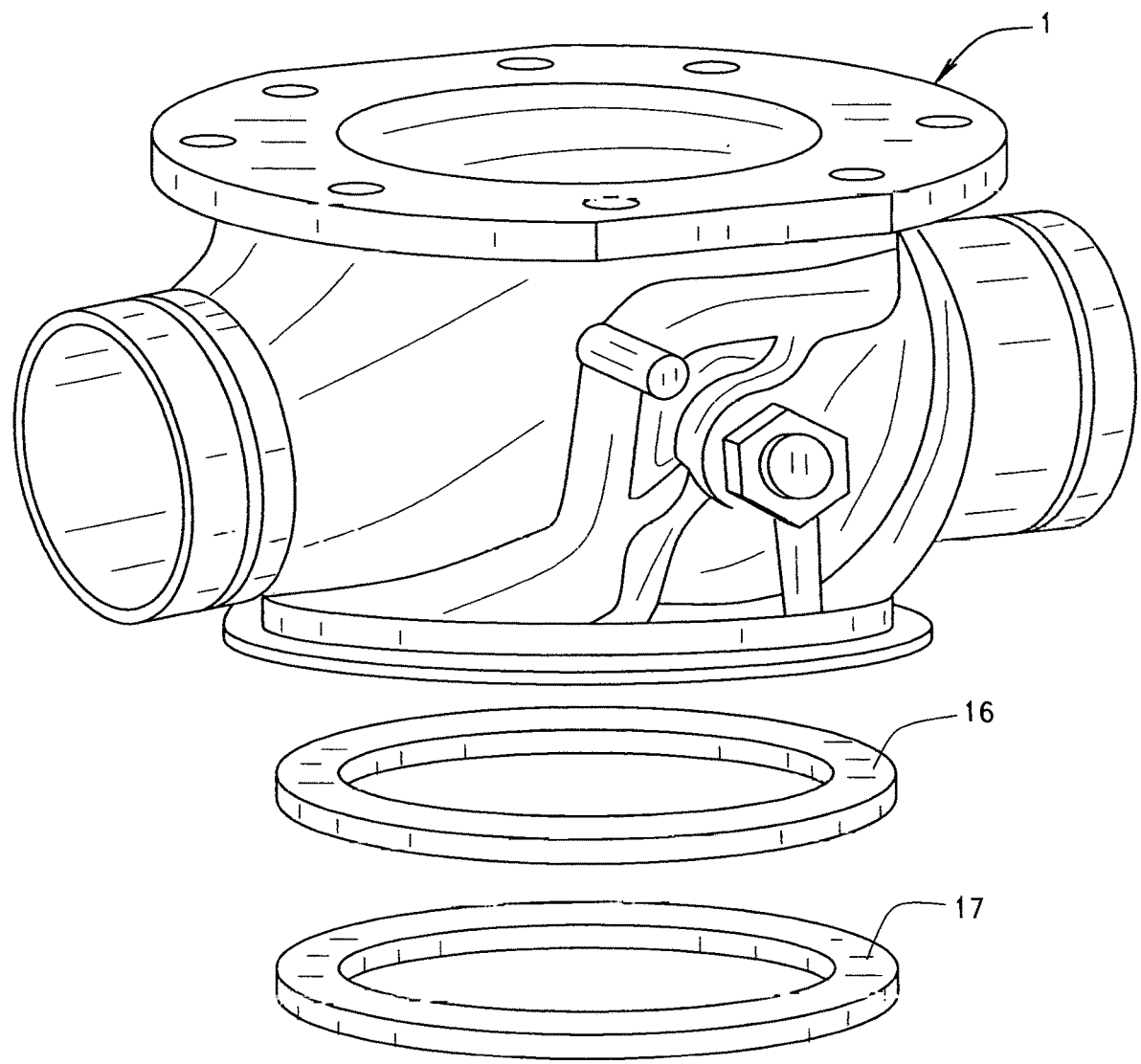
FIG. 7 provides an isometric view of the tee, with the bottom valve gasket, and its support plate, being separated from the bottom of the shown tee.

As can be seen in FIG. 7, the gasket 16 is shown below the tee 1, during its assembly stage with the support plate 17, and its clamp as noted during this stage of the assembly, as the gasket and the clamp are located beneath the structures tee, as can be seen in FIGS. 4 and 5.

Figure 8:
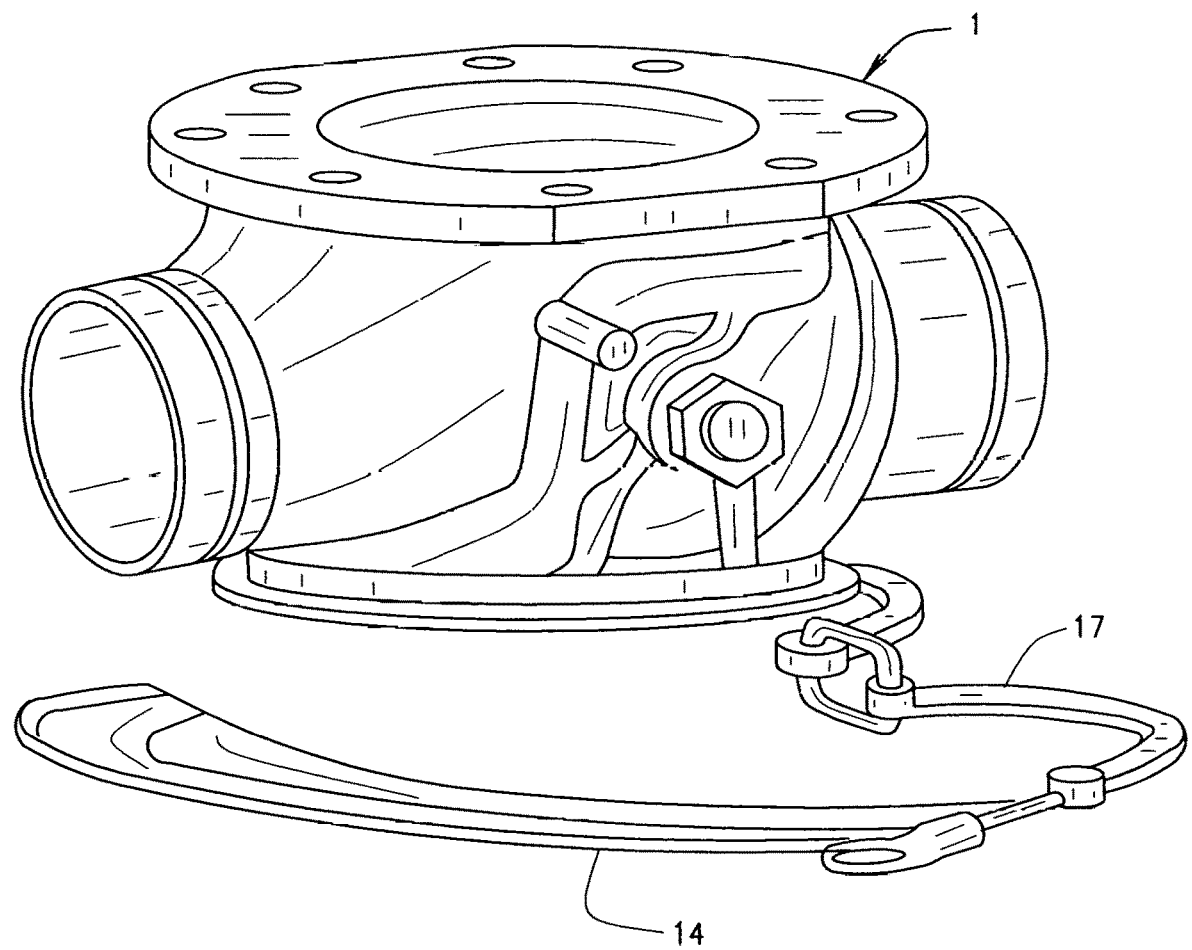
FIG. 8 shows the clamp means that secures the bottom gasket and associated plate of FIG. 7 to the bottom of the tee in preparation for its assembly.

A similar view of the plate and clamp 17 can be seen in FIG. 8

Figure 9:
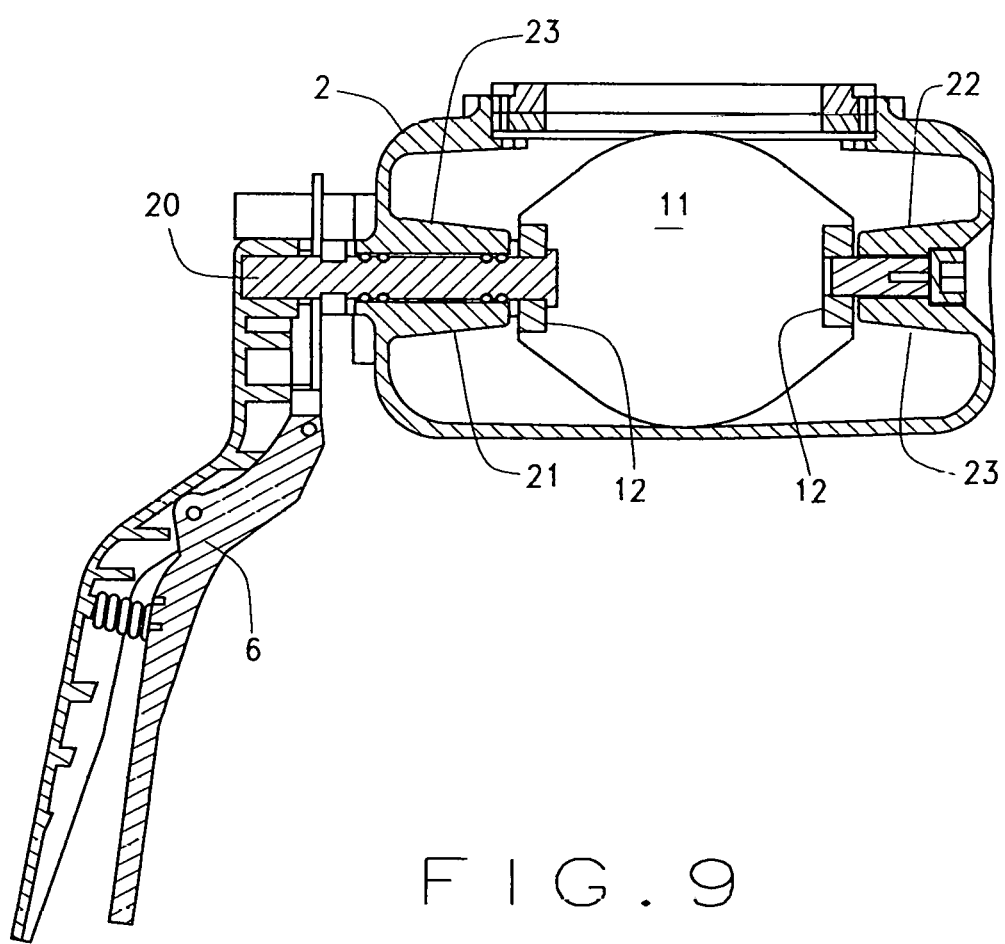
FIG. 9 provides a sectional view through the tee, and its manual handle, showing its valve set for preventing the inline flow of granular material during an unloading operation.

FIG. 9 generally shows a transverse view taken through the embodiment of FIG. 1, where the manual handle 6 has been pivoted downwardly, to locate the disc valve 11, against the incoming opening of the horizontal section 2 of the tee, generally as shown in the position as noted in FIG. 5. The handle connects with the bearing shafts 20 on one side of the horizontal portion of the structured tee 2, and secures the handle 6, with the shaft 20, that connects with the upright supports 12 of the shown disc valve 11. In this position, the disc valve provides a full port opening into the tee, that is unobstructed by the disc valve, particularly when a bottom drop form a discharge is to be undertaken. The shaft 20 is generally installed from the inside of the tee, pulling the upright supports 12 of the disc valve into contact with the various bushings and O rings, as noted at 21, in order to reduce any contamination of granular material in this vicinity as previously explained. The stub shaft 22, on the opposite side of the disc valve 11, similarly connects with its contiguous upright support 12, of the valve, and it is also securely mounted within the integral bearing supports 23, on its side of the tee, as can be noted. The bearing supports are integrally formed with the structure of the tee, as noted.

The purpose of this invention is to replace the current valve and tee combination with a tee that has a segment ball valve built into it. This is the disc valve 11, as explained. This allows for the unobstructed flow path for unloading product, whether it be horizontally through the tee, or to allow for discharge in the bottom drop method for unloading of bulk material from the tank trailer. Additional benefits, as previously explained, are realized from the height/ground clearance savings, by this manner of having the disc control member arranged within the tee, and not requiring any further closure means, at the bottom of the tee, as noted in the prior art.

Figure 10:
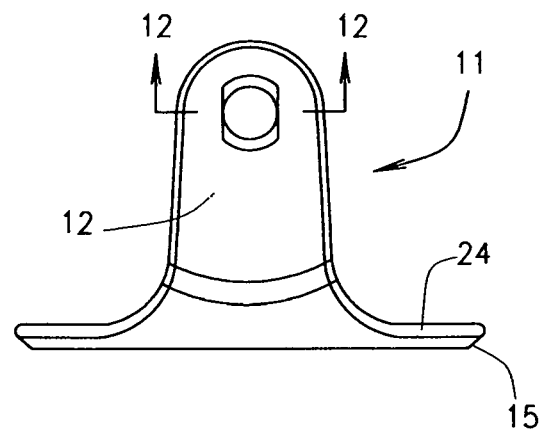
FIG. 10 provides a side view of the valve for the tee.
Figure 11:
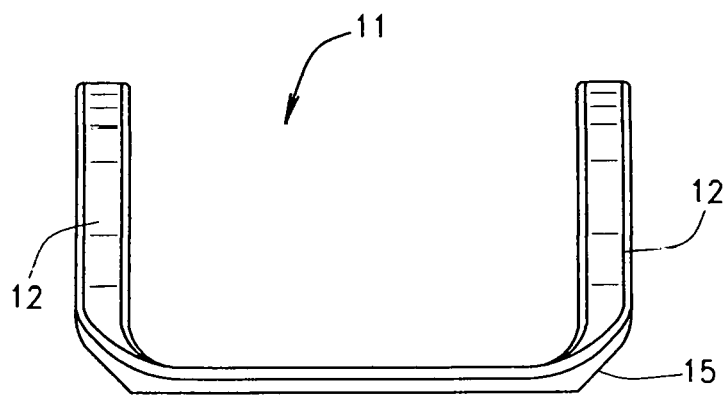
FIG. 11 shows a front view of the valve of the tee.

FIGS. 10 and 11 show the more detailed structure of the disc valve 11 for this invention. The disc valve has its structured bottom portion 24, with is chamfered or truncated edges 15 provided entirely around its periphery, in order to provide for a better seal with the valve seats as previously explained. When located in the position as shown in FIG. 4, it seats against its gasket 16, for sealed closure, and when pivoted 90° as noted in FIG. 5, it seals against the interior of the incoming flow path of the tee, as can be seen. The upright supports 12, integrally formed with the bottom of the disc valve, extend generally upwardly, in a somewhat U formed configuration, as noted in FIG. 11, and these supports secure to the inner ends of the bearing shafts 20 and stub shaft 22, as previously explained. Furthermore, when the shafts are arranged through the bearing supports 12, as can be noted in FIG. 12, the shafts are recessed within the supports 12, through their apertures 25, in order to keep the shafts out of the flow path of the material either passing through the horizontal portion of the tee, or dropping through the bottom drop opening of the tee, during the performance of the alternative discharge processes.

Figure 13:
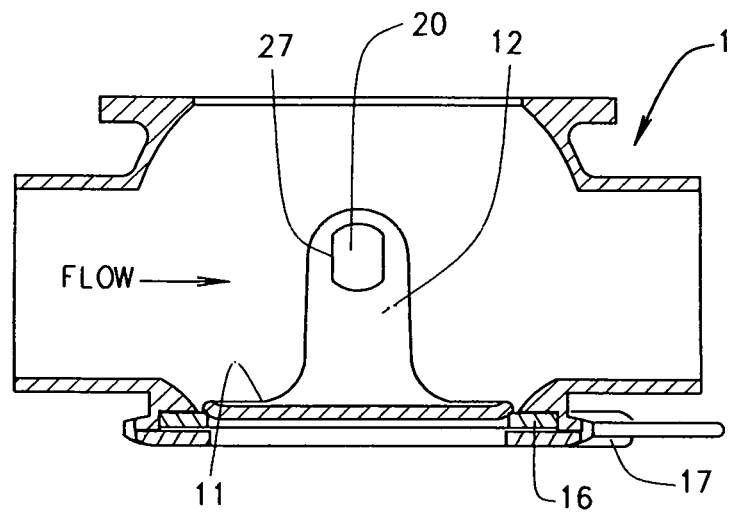
FIG. 13 is a schematic view of the bottom drop tee showing its disc valve locking the downward flow of granular material during an unloading operation.
Figure 14:
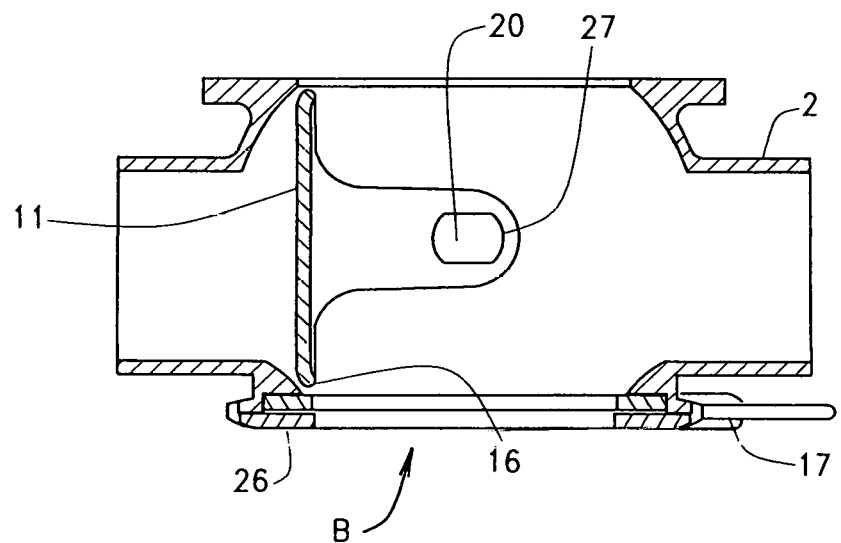
FIG. 14 is a schematic view of the tee showing its disc valve arranged and turned 90° to prevent the inline flow of granular material through the tee.

FIGS. 13 and 14 show the automatic bottom drop and combined tee and disc valve for the invention. As noted in FIG. 13, the tee 1 has its disc valve 11, supported by its supports 12, turned in a manner that positions the disc valve against its gasket 16, clamped by the clamp 17, to prevent the bottom drop discharge of the material being conveyed. Thus, the bottom of the tee is now closed. As noted in FIG. 14, the disc valve 11, has been pivoted approximately 90°, and closes off the incoming horizontal path of the tee 2, that is preventing the horizontal flow of the granular material during discharge, but allowing it to pass through the bottom opening B for discharge. The band clamp 17 secures the seat retainer 26 holding the gasket 16 into fixed position.

Figure 12:
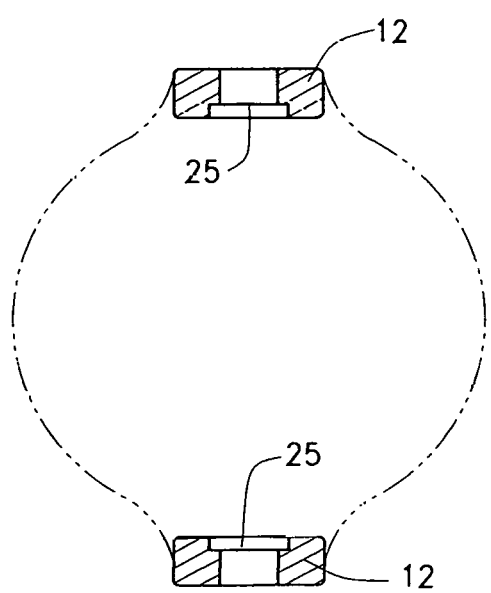
FIG. 12 shows how the bearings for the valve disc are recessed within the tee to keep them out of the flow path of any granular material.

It should also be noted that where the bearing shafts 20 and 22 locate through their various supports, in the manner as explained in FIG. 12, they have a double D flat interconnection, as seen at 27, to assure that the bearing shafts 20 and 22 have control over the pivoting of the disc valve, during the pivotal movement of it from one position to the other, as noted.

FIGS. 15 and 16 show more details relating to the locating of the bearing shafts 20 within their mount portions 5. As noted, the stub shaft 22, in addition to the inner end 13 of the bearing shaft 20, due to their recessed positioning, are out of the flow path F for the horizontal section of the structured tee 2. The various bushings 28 and 29 that hold the various shafts 20 and 22 in position, prevent wear between the tee, and the bearing shafts, as can be understood. The more detailed location of the bushings 28 with respect to the location of the various O rings 30 can be noted. The O rings provide a seal against the entrance of any contamination, or air leaks from the structure tee during its usage. At the exterior ends of the bearing shaft 20, and the stub shaft 22, are thrust washers and nuts, as at 31, to provide for securement of the bearing shafts in place, and to reduce any disc torque, when manipulating it between its various positions, as explained.

The structure of the various bearing shafts 20 and the stub bearing shaft 22 can be noted in FIGS. 17 through 21. The inner ends of these shafts have their interior flanges, respectively, as at 32 and 33, which, as previously explained, incorporate double D flats, to assure their securement with the disc supports 12, as previously explained. These flats can also be seen in FIG. 17, at 27. In addition, the various annular grooves, as at 34 and 35 support the O rings in position to provide for sealed location of the shafts within the disc supports 12, as previously explained.

Figure 22:
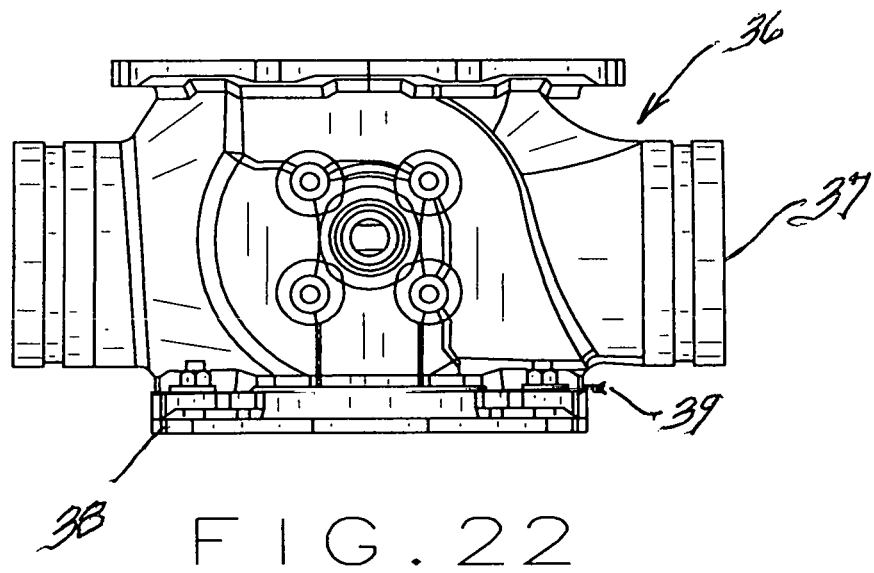
FIG. 22 is a side view showing the valve and tee combination.

FIG. 22 provides a side view of the tee structure 36 including the tee body 37, its seat retainer 38 and the seat retainer hardware 39 which cooperates with the disc valve to seal it in position when it is oriented to close off the bottom of the shown tee.

Figure 23:
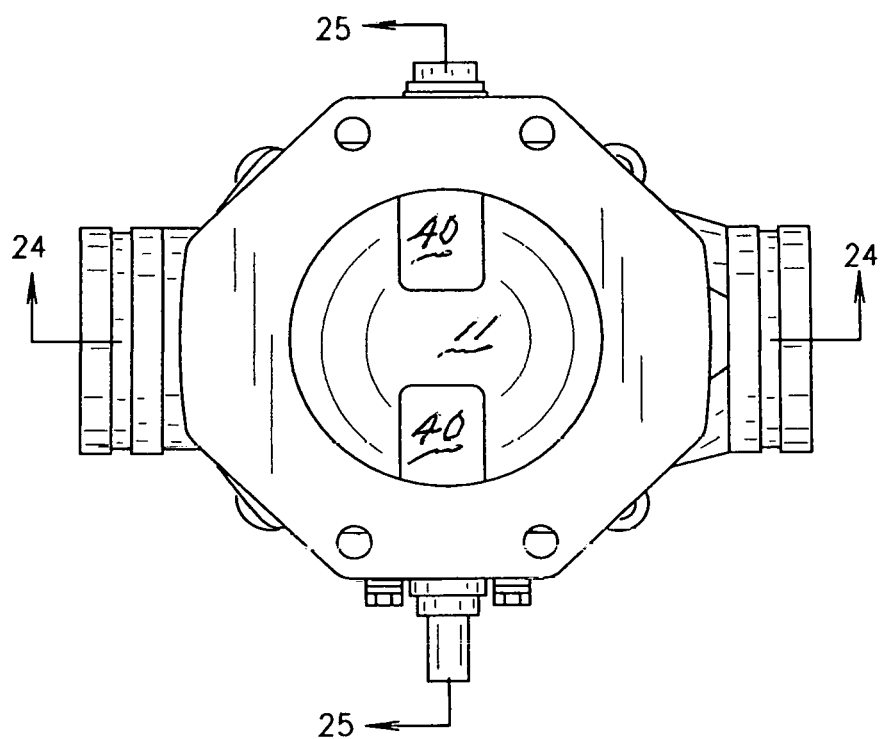
FIG. 23 is a top plan view of the tee of FIG. 22.

FIG. 23, being a top view of FIG. 22, shows the arrangement of the disc valve 11, held in its pivotal position by means of the bearing shafts 40, as noted.

Figure 24:
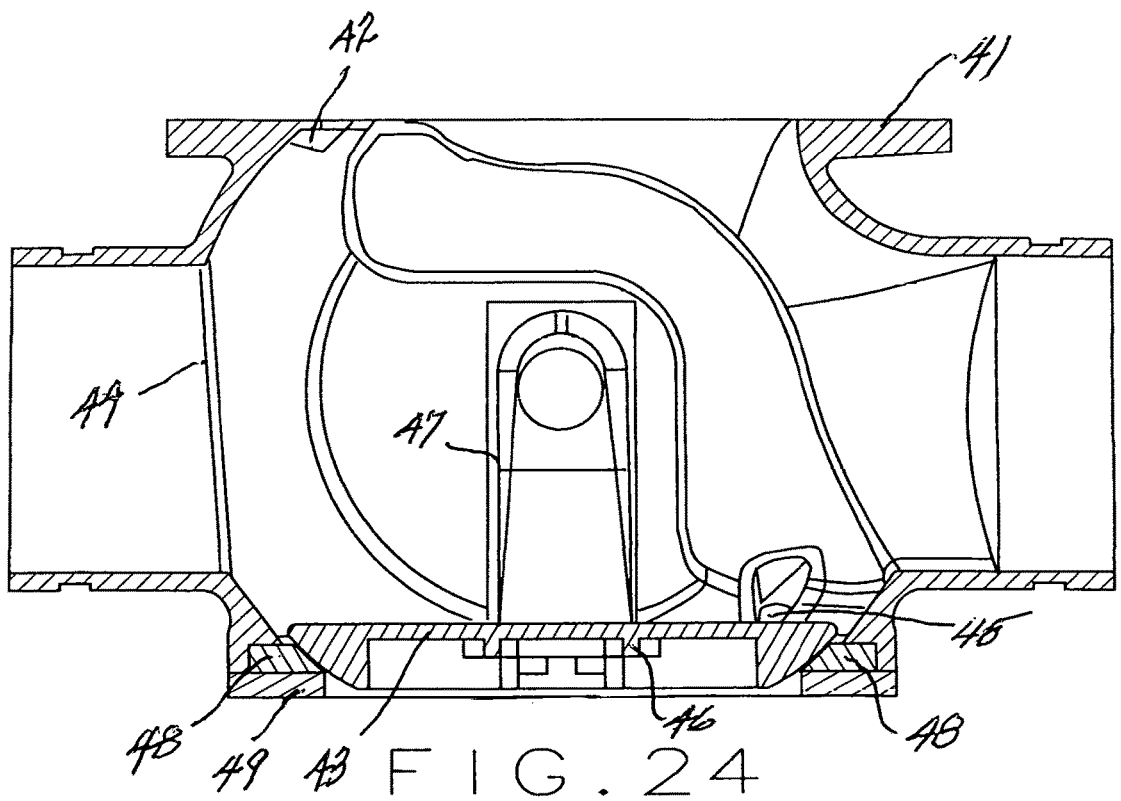
FIG. 24 is a longitudinal sectional view taken along the lines 24-24 of FIG. 23.

FIG. 24 provides that longitudinal section of view taken along line 24-24, of FIG. 23. The tee body 41 includes various stop means, such as the integral rotation limit stop 42 that limits the pivoting of the disc valve 43 when pivoted 90 degrees upwardly, in order to close off the entrance 44 into the tee, at the same time, an integral rotation limit stop 45 is provided, where noted, in order to limit the extent of the downward pivot of the disc valve 43, when manipulated to close off the bottom drop feature of the shown tee 41. The hardware 46 is noted, that secures the hardware to the disc arm 47 as can be noted. The seat 48 seals the disc valve 43 when it is pivoted into the position to prevent the bottom drop of any granular material out of the tank trailer, through the tee, during usage. The seat 48 is held into position by means of the seat retainer 49.

Figure 25:
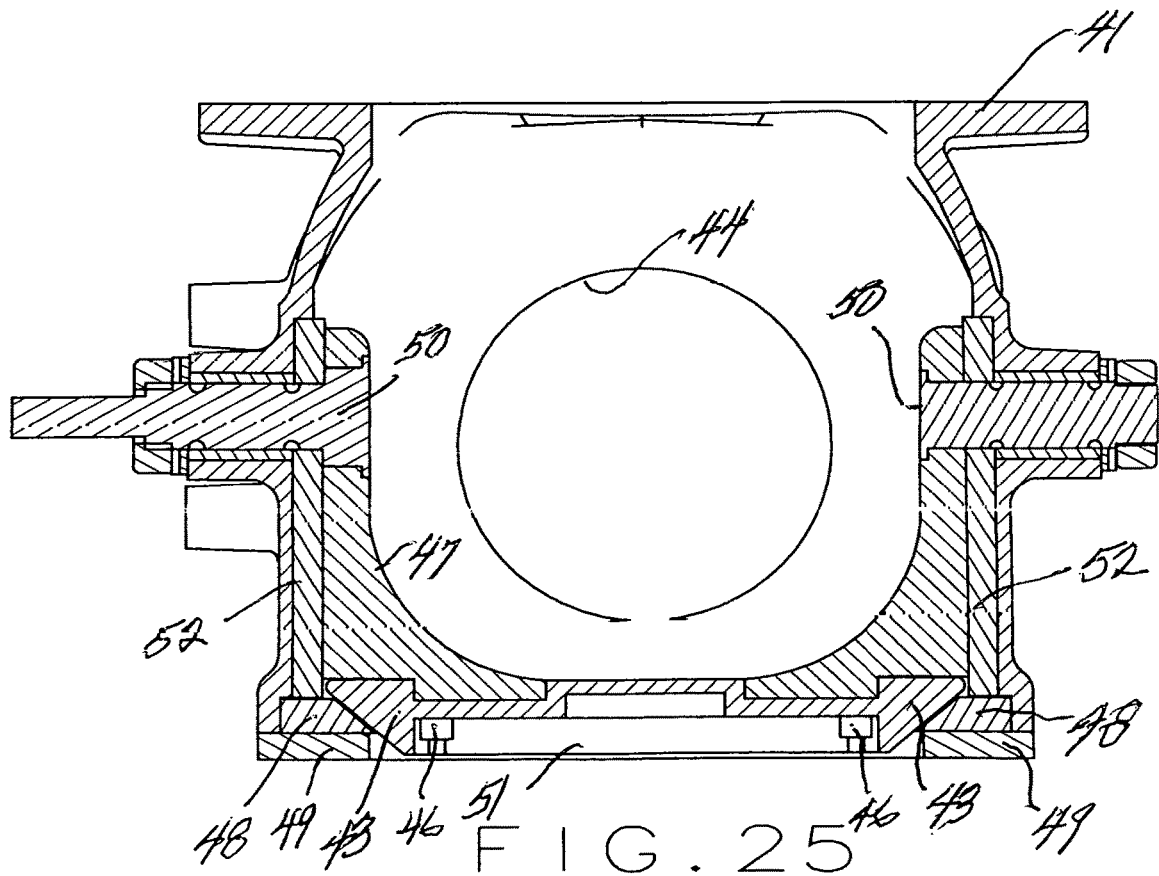
FIG. 25 is a transverse section of view taken through the tee along line 25-25 of FIG. 23.

A related view of the bottom drop tee is also noted in FIG. 25. This is the sectional view, transversely taken, along line 25-25, in FIG. 23. As noted, the tee 41 is designed for holding the disc arms 47 into position, by means of its bearings 50 so that when the disc valve 43 is pivoted downwardly, into a closure position upon the outlet 51 this opens the longitudinally disposed aperture 44 for transfer of air under pressure therethrough, for flowing of any granular material deposited into the tee longitudinally outwardly for horizontal conveyance from the tank trailer, to another location. The various structures as previously explained, such as the disc connection hardware 46 secures the disc to its disc arm 47, as can be noted. And, the valve seat 48, is also shown. And, the valve seat retainer 49 is noted. A disc arm wear plate, as at 52, is provided to either side of the disc arm 47, to function in combination with the bearings 50, in an effort to prevent any wear out of the disc arm, during its continuous usage and operation.

Thus, the concept of this invention has been thoroughly explained herein, it provides a disc valve that can be located entirely within the interior of the horizontal section of the structured tee 1, as explained, and which valve can be manipulated from a vertical position, that blocks horizontal flow through the tee, or in a lower position, that blocks the bottom drop discharge of granular material from the tee, during performance of an unloading operation. And, the pivoting of the disc valve can be done manually, or even automated, as noted in FIG. 3, to attain prompt positioning of the disc valve within the tee, in preparation for what type of unloading process may be required, under the circumstances. Furthermore, all of this type of manipulation, of a valve means, within a tee, can be achieved without any positioning of the valve exteriorly of the tee, which has no effect upon the ground clearance of the tee, as positioned at the bottom of the hopper bin, during performance of the alternative discharging procedures as can be obtained from the structured tee of this invention.

Variations and modifications to the subject matter of this invention may occur to those skilled in the art upon review of the summary as provided herein, and upon undertaken a study of the description of the preferred embodiments, in view of the drawings. The description as provided herein, and as depicted in the drawings, are set forth for illustrative purposes only. Any equivalent structures, that perform the same function, to attain the same results, are considered to be encompassed within the scope of any claims to patent protection issuing herein.

We claim:

1. An alternative bottom drop or straight tee discharged from a bulk tank trailer vehicle having various extensions for automatic and manual operations of the tee valve:
    a hopper tee, said hopper tee having a horizontal section through which pressurized air and granular material may flow, and an integral vertical section through which the bulk material flows upon discharge from the tank trailer;

said tee having a pair of seats, one formed at the bottom of the tee beneath its vertical section, and the second seat being provided approximately perpendicularly with respect to the first seat, and structured at the incoming flow portion of the horizontal section of the tee at its incoming air flow location beneath the vertical section of said tee;

a disc-like valve, said disc-like valve having a valve means for locating and seating proximate either of said seats provided within the tee, said disc-like valve having a circular disc portion, and upstanding integral supports;

a pair of bearings shafts, mounted to either side of the horizontal section of the tee, said bearing shafts mounting the upright supports of the disc-like valve for pivotal movement, provided for either a lowering of the disc-like valve to the bottom of the tee, or pivoting of the disc-like valve approximately 90° for blocking the incoming flow of pressurized air through the horizontal section of said tee; and mechanical means for providing either the automatic or manual turning of the disc-like valve to attain either a bottom drop unloading of granular material from the tank trailer, or to provide for the horizontal flow of granular material through the tee from said tank trailer vehicle.

2. The tee of claim 1 wherein the handle secures with one of the bearing shafts to provide for manual turning of the disc-like valve between its alternative positions.

3. The tee of claim 2, and including an extension between the handle, and the associated bearing shaft, to provide for the extended manipulation and turning of the disc-like valve within the tee when selecting the type of discharge required from the bulk tank through arrangement of said disc-like valve within the associated tee.

4. The tee of claim 1, and including a motorized means for turning of said disc-like valve between its alternative unloading positions for the tee.

5. The tee of claim 1, wherein the disc-like valve and said upright supports form a U-shaped configuration in their structure.

6. The tee of claim 1, and including said associated bearing shafts provided for pivotal connecting of the integral circular disc portion and the upstanding integral supports of the disc-like valve to the hopper tee in operation.

7. The tee of claim 6, including a valve seat provided surrounding the opening at the bottom of the tee, and provided for cooperating with the disc-like valve when sealing the tee from the downward discharge of material from the hopper tee during its operations.

8. The tee of claim 1, including disc arm wear plates provided to either side of the tee arranged between the upstanding integral supports of the disc-like valve and the hopper tee to protect the disc-like valve against wear during usage.

9. The tee of claim 1, wherein one of said bearing shafts is an operating shaft, connected to the mechanical means for providing turning of the disc-like valve, and the other of the bearing shafts being a stub shaft, to provide for pivot of the disc-like valve within the tee during its manipulation.

\* \* \* \* \*